United States Patent
Hagbard

(10) Patent No.: US 9,363,034 B2
(45) Date of Patent: Jun. 7, 2016

(54) METHOD TO ENCRYPT INFORMATION THAT IS TRANSFERRED BETWEEN TWO COMMUNICATION UNITS

(75) Inventor: Stefan Hagbard, Lidingo (SE)

(73) Assignee: SECUMOBI AB, Lidingo (SE)

( * ) Notice: Subject to any disclaimer, the term of this patent is extended or adjusted under 35 U.S.C. 154(b) by 509 days.

(21) Appl. No.: 13/639,178

(22) PCT Filed: Feb. 23, 2011

(86) PCT No.: PCT/SE2011/050206
§ 371 (c)(1),
(2), (4) Date: Oct. 3, 2012

(87) PCT Pub. No.: WO2011/126425
PCT Pub. Date: Oct. 13, 2011

(65) Prior Publication Data
US 2013/0064373 A1 Mar. 14, 2013

(30) Foreign Application Priority Data
Apr. 7, 2010 (SE) ...................................... 1050332

(51) Int. Cl.
*G06F 17/30* (2006.01)
*G06F 7/04* (2006.01)
*G06F 15/16* (2006.01)
(Continued)

(52) U.S. Cl.
CPC *H04K 1/00* (2013.01); *H04L 9/065* (2013.01); *H04L 9/0827* (2013.01); *H04L 9/0841* (2013.01); *H04L 63/0457* (2013.01); *H04W 88/02* (2013.01)

(58) Field of Classification Search
CPC ..... H04W 12/08; H04W 12/06; H04W 88/02; H04L 63/20; H04L 63/123; H04L 9/084; H04L 63/0457; H04L 2209/80; H04L 9/06; G06F 21/60; G06F 21/606
USPC ........ 726/4, 9, 26, 17, 20; 713/173, 175, 185, 713/168; 380/200, 252
See application file for complete search history.

(56) References Cited

U.S. PATENT DOCUMENTS

| | | | |
|---|---|---|---|
| 2004/0158825 A1* | 8/2004 | Kim | ............................ 717/148 |
| 2006/0288423 A1* | 12/2006 | Le et al. | ......................... 726/26 |
| 2008/0171578 A1 | 7/2008 | Tysowski | |

(Continued)

OTHER PUBLICATIONS

International Search Report, dated Apr. 13, 2011, from corresponding PCT application.

*Primary Examiner* — Ali Abyaneh
*Assistant Examiner* — Feliciano Mejia
(74) *Attorney, Agent, or Firm* — Young & Thompson

(57) ABSTRACT

Method for encrypting information transferred between two mobile telephones, each having a security module and where a security application contains encryption and decryption algorithms. The security application is stored on an SD card introduced into a card-holder location in the relevant telephone, then transferred from the card to the security module with a session key stored on the card, a key stream forms in the card on the basis of the session key, and during encryption is transferred from the card to the security module where encryption takes place, such encrypted stream of data is transmitted by the telephone, the stream of data is received by a second mobile telephone, decryption takes place with a corresponding key stream in the security module of the second telephone and the corresponding key stream is formed in the SD card of the second telephone on the basis of the session key.

17 Claims, 4 Drawing Sheets

(51) Int. Cl.
*H04L 29/06* (2006.01)
*H04K 1/00* (2006.01)
*H04L 9/06* (2006.01)
*H04L 9/08* (2006.01)
*H04W 88/02* (2009.01)

(56) References Cited

U.S. PATENT DOCUMENTS

2008/0279381 A1* 11/2008 Narendra et al. ............. 380/270
2009/0122984 A1 5/2009 Fascenda et al.

* cited by examiner

METHOD TO ENCRYPT INFORMATION THAT IS TRANSFERRED BETWEEN TWO COMMUNICATION UNITS

BACKGROUND OF THE INVENTION

1. Field of the Invention

The present invention relates to a method to encrypt information that is transferred between two communication units. The communication units may be mobile telephones, personal computers, electronic tablets, palm-top computers, etc. The present invention will be described below, however, for the case in which the communication units are mobile telephones. Therefore, the term "mobile telephone" is used below and in the claims to denote a communication unit of the type specified above. The term "information" is used to denote a voice conversation and the transfer of data between two communication units. The transfer of data comprises the transfer of images. With respect to the transfer of information between two mobile telephones, this is also referred to using the term "telephone call".

2. Description of the Related Art

There is a need to encrypt information that is transferred between two mobile telephones such that it is not possible for a third party to eavesdrop on conversations and data.

One way of achieving the encryption of telephone calls is to realise a security application on an SD card, which is inserted into a card-holder location in the mobile telephone. The information is in this way passed across an interface between the CPU of the mobile telephone, with its associated memory, and the said SD card. One problem with sending streams of data between an application on an SD card and the mobile telephone is that the limiting resources of the mobile telephone are used, in that the said interface has a limited capacity for the transfer of data. In many cases, the transfer requires so much resources that the function cannot be carried out. A second problem is that such a transfer of data leads to the consumption of power becoming so high that the battery duration is severely reduced. A third problem is that an encryption key, which is present in the memory of the mobile telephone, is exposed in an insecure environment.

BRIEF SUMMARY OF THE INVENTION

The present invention solves these three problems.

The present invention thus relates to a method to encrypt information that is transferred between two communication units such as mobile telephones, personal computers, palm-top computers, etc., where a security module is present in each mobile telephone and where a security application contains encryption and decryption algorithms, and is characterised in that the security application is caused to be stored on an SD (Secure Digital) card that is caused to be introduced into a card-holder location in the relevant mobile telephone, in that the security application is caused to be transferred from the SD card to the security module of the mobile telephone in addition to a session key stored on the SD card, in that a key stream is caused to be formed in the SD card on the basis of the session key, in that the key stream is caused during encryption to be transferred from the SD card to the security module of the mobile telephone, in that the encryption is caused to take place in the security module of the mobile telephone, after which such an encrypted stream of data is transmitted by the mobile telephone, in that the stream of data is received by a second mobile telephone, in that decryption is caused to take place with the aid of a corresponding key stream in the security module of the second mobile telephone and in that the said corresponding key stream is caused to be formed in the SD card of the second mobile telephone on the basis of the said session key.

BRIEF DESCRIPTION OF THE DRAWINGS

The invention will be described below in more detail, partly in association with embodiments of the invention shown in the attached drawings, where.

DETAILED DESCRIPTION OF THE PREFERRED EMBODIMENTS

Figure 1:
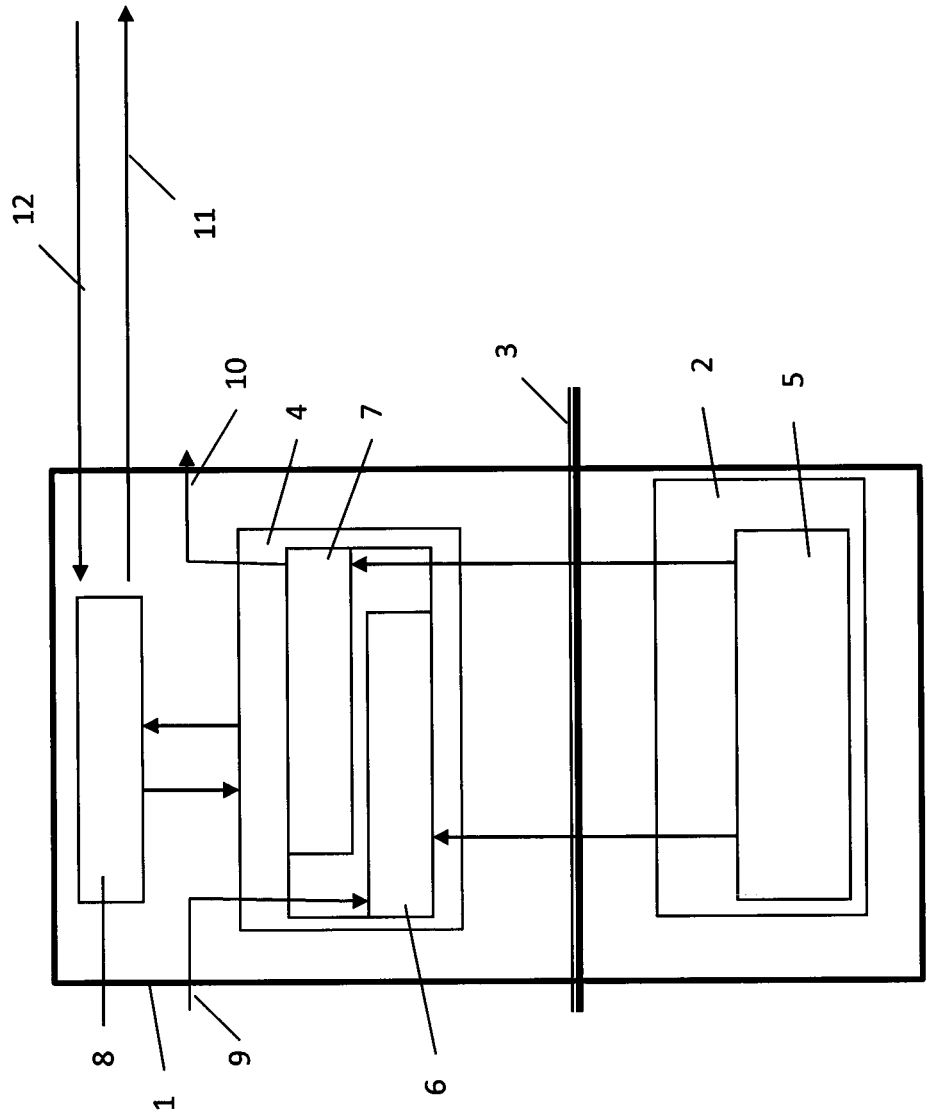
FIG. 1 illustrates schematically the present invention together with a mobile telephone, FIG. 2 constitutes a more detailed illustration of that which is shown in FIG. 1.

FIG. 1 illustrates the present method for encrypting information that is transferred between two communication units such as mobile telephones, personal computers, palm-top computers, etc., where a security module 4 is present in each mobile telephone 1 and where a security application contains encryption and decryption algorithms. Only a first mobile telephone 1 is shown in FIG. 1. A second mobile telephone, not shown, is arranged in a corresponding manner such that the mobile telephones can communicate with each other across a communication network. The invention can be applied for various communication networks such as GSM, 3G, 4G or over IP, so called "VoIP telephony". The invention will be described below, however, for the case of VoIP telephony.

The mobile telephone 1 is provided with a card-holder location for an SD card 2. Further, the mobile telephone comprises a memory, in a known manner. An interface 3 is present between the memory of the mobile telephone and an SD (Secure Digital) card that has been introduced into the card-holder location.

According to the invention, the said security application is caused to be stored on an SD card 2, which is caused to be introduced into a card-holder location in the relevant mobile telephone. The security application is caused to be transferred from the SD card to the said security module 4 of the mobile telephone, in addition to a session key stored on the SD card 2. A key stream is caused to be formed in the SD card on the basis of a session key, for encryption and for decryption.

Figure 4:
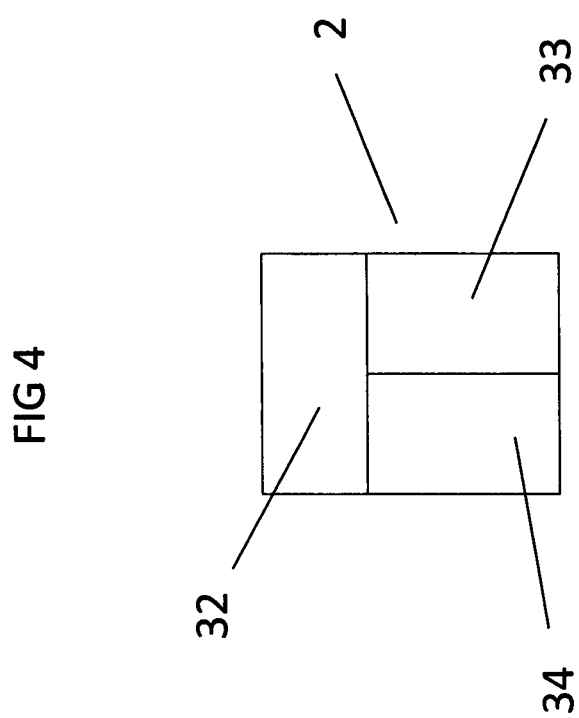
FIG. 4 illustrates an SD-card.

The said SD card 2 is illustrated in FIG. 4. The SD card 2 comprises a processor 32, a memory 33 and a smart-card circuit 34 of conventional type. The said security application is stored in the memory 33, which security application is to be transferred to the memory of the mobile telephone, as is also the security application, which is used by the SD card during encryption and decryption.

During encryption and decryption, the key stream is caused to be transferred to the security module 4 of the mobile telephone across the interface 3, and the encryption or decryption is caused in this way to take place in the security module 4 of the mobile telephone. An encrypted stream of data is sent out by the mobile telephone 1 following encryption of information, such as a voice. This stream of data is received by the second mobile telephone, not shown. Decryption is caused to take place with the aid of a corresponding key stream in the security module of the second mobile telephone, where the said corresponding key stream is caused to be formed in the SD card of the second mobile telephone on the basis of the session key.

The reference number 5 in FIG. 1 denotes algorithms for the generation of session keys and key streams for encryption and decryption, which algorithms are stored on the SD card. The reference number 6 denotes algorithms for encryption that contain key streams, which have been retrieved from the SD card 2. The reference number 7 denotes algorithms for decryption that contain key streams, which have been retrieved from the SD card 2. The reference number 8 denotes an application for IP telephony. The reference number 9 denotes a signal from the microphone of the mobile telephone, and the reference number 10 denotes a signal to the loudspeaker of the mobile telephone. The arrow 11 illustrates encrypted information sent out by the mobile telephone and the arrow 12 illustrates encrypted information received by the mobile telephone.

Through the session key and the generation of key streams being protected on the SD card, the method according to the invention is very secure.

According to one preferred design, the security application in the security module 4 of the mobile telephone is caused to be deleted after the transfer of information between the mobile telephones has been completed. One way of achieving the deletion is to ensure that the security module in the mobile telephone no longer has contact with the SD card. This can be achieved through the telephone application breaking the connection with the SD card when a call is disconnected, or through the SD card being removed from the mobile telephone, whereby the security module in the mobile telephone no longer has contact with the SD card.

It is obvious that the actual encryption or decryption takes place in the security module 4 of the mobile telephone, and for this reason the flow of information across the interface is limited to an order of magnitude of one half of that required if the encryption or decryption were to take place in the SD card 2. Also the power consumption will in this way be highly reduced when the present invention is applied.

The said session key is a secret that is known to both parties, while no external actors may know it. It is preferred that this session key is established through Diffie-Hellman key generation, using, for example, the Mikey protocol. In this way can both parties generate a secret session key without the key being exposed in the public network. The present invention, however, is not limited to any particular encryption and decryption algorithms or methods, nor to any methods of generating keys since all suitable methods can be used.

According to one preferred embodiment, the used session key is caused to be changed between two occasions of connection, one after the other, between two mobile telephones.

It is furthermore preferred that information about the session key that is to be used during a particular call is caused to be transferred from the calling mobile telephone to the receiving mobile telephone during the establishment of the connection between the telephones.

A key stream is derived from this session key, which key stream is used as a mask to permute (change/move) the bit stream in the data, such that only the one who can generate an identical bit stream can recreate the bit pattern in the stream, i.e. the inverse function of the permutation. An example of such a masking function is the logical XOR function (Exclusive OR).

An example of an encryption operation is given below:

| RTP (Real Time Protocol) | 01101101 | bit stream of data |
| Key stream | 10101001 | derived from the session key |
| Gives an ouput S (Safe)-RTP | 11000100 | encrypted bit stream of data |

The encrypted bit stream of data is received and decrypted:

| Incoming S-RTP | 11000100 | bit stream of data |
| Key stream | 10101001 | derived from the session key |
| RTP | 01101101 | Decrypted bit stream of data. |

XOR is used in this example to mask the stream of data with the key stream that has been generated by for example AES CTR (American Encryption Standard Counter Mode). It is Counter Mode that defines how a key stream is to be derived from the relevant session key.

A VoIP application 8 (IP telephony application) is present in the telephone, which application generates RTP frames, which represent microphone and loudspeaker in digital form. These RTP frames must be encrypted and decrypted in order for the communication to be secure, since the RTP frame is transmitted across an IP connection. A security application is available for the VoIP application, which security application is partly installed in the security module 4 of the telephone and partly installed in the safety module of the SD card 2. The said session key for communication is generated and protected in the security module on the SD card, using, for example, Diffie-Hellman or other key exchange. Furthermore, the security module on the SD card generates the key stream, which constitutes the bit stream that is to be permuted with the stream of data in the RTP frames in order to obtain the encrypted RTP frames (S-RTP). This is sent to the receiving telephone, and vice versa for incoming packets.

The permutation is carried out in the part of the application that has been placed into the security module 4 of the mobile telephone.

Through the bit stream of data and the key stream being permuted in the security module 4 in the mobile telephone, the exchange of information across the interface between the telephone and the card will be approximately halved, while at the same time the session key never leaves the safe environment of the SD card. This constitutes a safer implementation that makes it possible to protect the cryptography function in the environment of the SD card without risk-filled exposure of the session keys and without data encryption in the unsafe environment of the mobile telephone.

Figure 2:
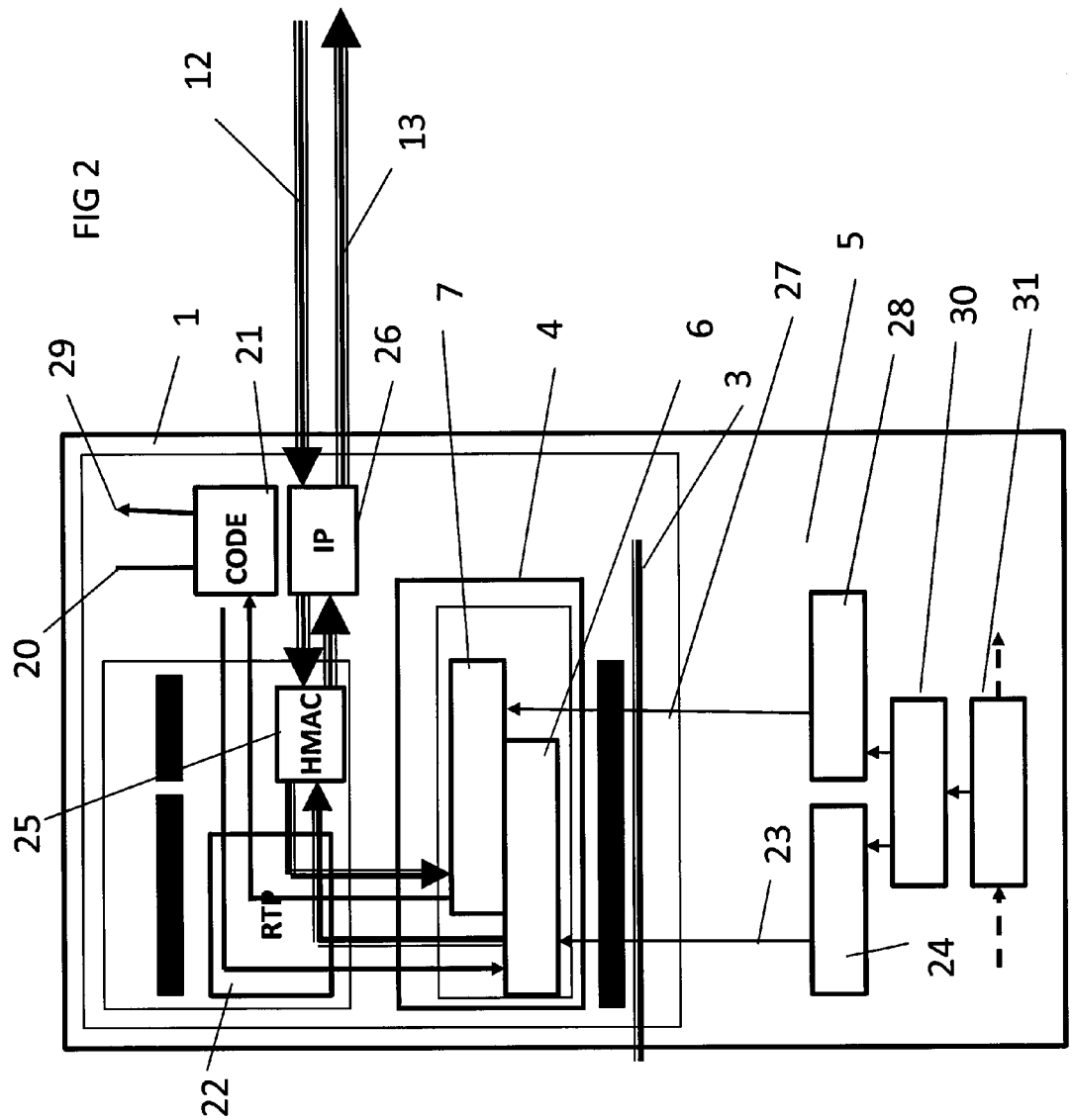

The streams of data and the information streams for encryption and decryption are illustrated in more detail in FIG. 2. When, for example, a person speaks into the microphone of the mobile telephone 1 a signal 20 passes from the microphone to a circuit 21, denoted "CODEC" in FIG. 2. CODEC is an acronym for "Coder-Decoder", which is an analogue-digital converter and the signal is transferred onwards to a circuit RTP with reference number 22, where the speech is packaged into an RTP frame. The RTP frames are transferred onwards to the security module 4 of the mobile telephone 1, where the RTP frames are encrypted by means of a key stream 23 for encryption, which has previously been obtained from a key stream generator 24 on the SD card 2. The encrypted RTP frames are transferred through a circuit 25 HMAC, which integraty protects the information, to an IP application 26, IP, whereby the encrypted message 13 is transmitted from the mobile telephone 1. HMAC is an acronym for Hash-Based Message Authentication Code.

An incoming encrypted signal 12 that the mobile telephone receives is transferred through the IP application 26 to the HMAC circuit 25 and onwards to the security module of the mobile telephone, where it is decrypted by means of a key stream 27 for decryption, which has previously been obtained from a key stream generator 28 on the SD card 2. The decrypted RTP frames are transferred through the CODEC circuit 21 and a conductor 29 to the loudspeaker of the mobile telephone, where the message can be heard in plaintext.

The reference number 30 in FIG. 2 denotes a memory area of session keys, which area cannot be accessed from outside. The reference number 31 refers to an application for the authentication of a user for the transmission of an encrypted message.

According to a further preferred embodiment, a transfer that is to be encrypted is started by the user being caused to select a telephone number that has been provided with a predetermined prefix.

An embodiment is that when the user has input information, for example retrieved information from the telephone book or input a string through the keyboard of the mobile telephone, this information is transferred to a so called "event-handler" in the mobile telephone. This event-handler currently checks only whether the user has specified an emergency telephone number, 112, 911, and—if this is the case—connects an emergency call independently of the normal telephone connection procedures. According to one embodiment of the invention, the event-handler is arranged to carry out a further check of the prefix in the string that the user specified. According to the invention, this prefix constitutes a suitable known symbol, * or #, for example, or a direct-dialing number or another alphanumerical code. On the condition that the prefix precedes a telephone number, the event-handler is arranged to call the applications that have been described above and that are required in order to carry out an encrypted exchange of information between two mobile telephones.

If a prefix is not given, the complete string can be matched to known strings, such as 343, which in this case corresponds to the application EID, Electronic Identification, which is called in this case with an empty argument. Thus the task of requesting the input data that is required, such as a security code, is handed over to the application.

Figure 3:
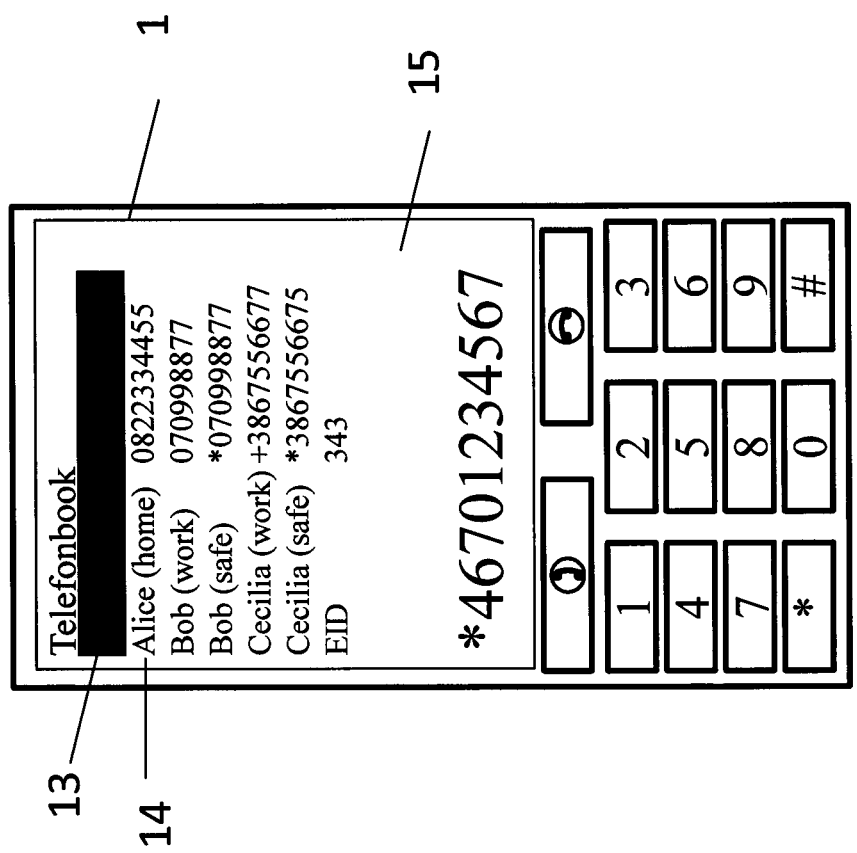
FIG. 3 illustrates an embodiment.

This embodiment is illustrated in FIG. 3. The user has previously input names and telephone numbers in the conventional manner, and has thereby input the telephone numbers in a traditional manner, as is shown with the number for Alice, denoted by the reference number 14. The user has input also Alice's number with the prefix *, as described above, and this is denoted by the reference number 13. If the user selects the marked telephone number, with reference number 13, an encrypted transfer will be initiated, as has been described above.

It is obvious that the present invention solves the problems described in the introduction.

A number of embodiments have been described above. The invention can, however, be varied. Other suitable encryption and decryption algorithms, for example, may be used. Furthermore, parts of the key streams may be transferred through the interface to the security module of the mobile telephone after remaining parts of the key streams have been transferred to the security module of the mobile telephone.

The present invention, therefore, is not to be considered to be limited to the embodiments specified above since it can be varied within the scope specified by the attached patent claims.

The invention claimed is:

1. A method to encrypt information that is transferred between two communication units, a security module being present in each communication unit, the method comprising:
introducing a Secure Digital (SD) card in a card-holder location in a first one of the communication units, a security application containing encryption and decryption algorithms being stored on the SD card;
transferring the security application from the SD card to the security module of the first communication unit except for a session key stored on the SD card;
forming a session key derived stream in the SD card based on the session key, the session key derived stream being a stream of information derived from the session key;
transferring the session key derived stream from the SD card to the security module of the first communication unit;
encrypting a data stream, in the security module of the first communication unit, including a plurality of sub pieces of information transmitted one after the other over time using the session key derived stream to obtain an encrypted stream of data;
transmitting the encrypted stream of data by the first communication unit after the encryption; and
wherein the encrypted stream of data is received by a second one of the communication units, decryption occurring with the aid of a corresponding key stream in the security module of the second communication unit, the corresponding key stream being formed in an SD card of the second communication unit based on the session key.

2. The method according to claim 1, further comprising deleting the security application in the security module of the first communication unit after transfer of information is completed.

3. The method according to claim 1, further comprising changing the session key used between two occasions of connection, one following the other, between two communication units.

4. The method according to claim 1, further comprising transferring the session key from the one of the communication units that is transmitting a call to one of the communication units that is receiving the call during establishment of a connection between the call-transmitting communication unit and the call-receiving communication unit.

5. The method according to claim 1, wherein the session key is established through Diffie-Hellman key generation using a Multimedia Internet KEYing (MIKEY) protocol.

6. The method according to claim 1, wherein the transfer of information is through Voice over IP (VoIP), the VoIP being IP telephony.

7. The method according to claim 1, wherein a transfer that is to be encrypted is initiated by a user selecting a telephone number that has been provided with a predetermined prefix.

8. The method according to claim 2, further comprising changing the session key used between two occasions of connection, one following the other, between two communication units.

9. The method according to claim 2, further comprising transferring the session key from the one of the communication units that is transmitting a call to one of the communication units that is receiving the call during establishment of a connection between the call-transmitting communication unit and the call-receiving communication unit.

10. The method according to claim 2, wherein the session key is established through Diffie-Hellman key generation using a Multimedia Internet KEYing (MIKEY) protocol.

11. The method according to claim 3, further comprising transferring the session key from the one of the communication units that is transmitting a call to one of the communication units that is receiving the call during establishment of a connection between the call-transmitting communication unit and the call-receiving communication unit.

12. The method according to claim 3, wherein the session key is established through Diffie-Hellman key generation using a Multimedia Internet KEYing (MIKEY) protocol.

13. The method according to claim 4, wherein the session key is established through Diffie-Hellman key generation using a Multimedia Internet KEYing (MIKEY) protocol.

14. The method according to claim 1, wherein the communication units are one or more of mobile telephones, personal computers, and palm-top computers.

15. The method according to claim 1, wherein the session key derived stream is a bit mask stream used to change the data stream to be encrypted.

16. The method according to claim 1, wherein the data stream to be encrypted is continuously updated information, and the session key derived stream is continuously updated and applied to the data stream to be encrypted.

17. The method according to claim 1, wherein the data stream to be encrypted is transferred in realtime to the receiving second one of the communication units.

* * * * *